(12) United States Patent
Jebali et al.

(10) Patent No.: US 10,374,384 B2
(45) Date of Patent: Aug. 6, 2019

(54) LASER FEEDBACK CONTROL SYSTEMS

(71) Applicant: AFL Telecommunications LLC, Duncan, SC (US)

(72) Inventors: Mohamed Amine Jebali, Duncan, SC (US); Ryo Hasehawa, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/746,274

(22) PCT Filed: Jul. 19, 2016

(86) PCT No.: PCT/US2016/042902
§ 371 (c)(1),
(2) Date: Jan. 19, 2018

(87) PCT Pub. No.: WO2017/015261
PCT Pub. Date: Jan. 26, 2017

(65) Prior Publication Data
US 2018/0212394 A1    Jul. 26, 2018

Related U.S. Application Data

(60) Provisional application No. 62/194,346, filed on Jul. 20, 2015.

(51) Int. Cl.
*H01S 3/13* (2006.01)
*H01S 3/223* (2006.01)
(Continued)

(52) U.S. Cl.
CPC .......... *H01S 3/1305* (2013.01); *B23K 26/032* (2013.01); *B23K 26/0626* (2013.01);
(Continued)

(58) Field of Classification Search
CPC .......... H01S 3/1305; H01S 3/134; H01S 3/13; H01S 3/0071; H01S 5/0683
See application file for complete search history.

(56) References Cited

U.S. PATENT DOCUMENTS 4,746,202 A * 5/1988 Perilloux ............. G02B 5/0858
219/121.74
5,412,681 A * 5/1995 Eisel ..................... H01S 3/0315
372/19
(Continued)

OTHER PUBLICATIONS https://web.archive.org/web/20131214074920/http://www.rp-photonics.com:80/fresnel_equations.html, Dec. 14, 2013.*
(Continued)

*Primary Examiner* — Michael Carter
(74) *Attorney, Agent, or Firm* — Dority & Manning, P.A.

(57) ABSTRACT

A laser feedback control system includes a laser operable to emit a laser beam. The control system further includes a prism mirror which includes a first reflective surface. The first reflective surface is oriented to reflect the laser beam at a first angle to a first direction of travel of the laser beam. The control system further includes a sampling mirror, the sampling mirror partially reflective and oriented such that the laser beam reflected at the first angle by the first reflective surface encounters the sampling mirror at a polarization insensitive angle of incidence. The control system further includes a detector positioned to detect a portion of the laser beam transmitted through the sampling mirror.

19 Claims, 2 Drawing Sheets

(51) Int. Cl.
*H01S 3/00* (2006.01)
*H01S 3/11* (2006.01)
*H01S 3/134* (2006.01)
*B23K 26/03* (2006.01)
*B23K 26/06* (2014.01)
*G02B 27/10* (2006.01)

(52) U.S. Cl.
CPC .............. *H01S 3/0071* (2013.01); *H01S 3/11* (2013.01); *H01S 3/134* (2013.01); *H01S 3/2232* (2013.01); *G02B 27/108* (2013.01); *H01S 3/1306* (2013.01)

(56) References Cited

U.S. PATENT DOCUMENTS

| | | | |
|---|---|---|---|
| 5,797,050 A | 8/1998 | Smith | |
| 5,946,334 A | 8/1999 | Ema et al. | |
| 7,292,616 B2 * | 11/2007 | Grek | H01S 3/134 |
| | | | 219/121.61 |
| 8,009,363 B2 * | 8/2011 | Kuo | G02B 5/04 |
| | | | 359/618 |
| 2015/0014286 A1 | 1/2015 | Staupendahl | |

OTHER PUBLICATIONS

AFL Telecommunications LLC; International Patent Application No. PCT/US2016/042902; International Search Report; dated Sep. 22, 2016; (1 page).

* cited by examiner

LASER FEEDBACK CONTROL SYSTEMS

PRIORITY STATEMENT

This application is a National Stage Application of PCT/US2016/042902, filed on Jul. 19, 2016, which is based upon and claims the benefit of priority from U.S. Provisional Patent Application No. 62/194,346, filed Jul. 20, 2015, the disclosures of all of which are incorporated by reference herein in their entireties.

FIELD OF THE INVENTION

The present disclosure relates generally to improved feedback control systems for lasers, such as $CO_2$ lasers.

BACKGROUND OF THE INVENTION

Feedback control systems are generally utilized to stabilize the net output power level of associated lasers. Pulse width modulation control is generally utilized to control the duty cycle of the laser in order to obtain the desired net output power level.

Traditional $CO_2$ laser feedback control systems uses partial reflectors mounted at 45 degrees with respect to the beam path. This beam sampling technique is polarization sensitive. Therefore, in most cases, a special optical coating is applied to overcome this sensitivity. Such optical coating narrows down the reflection bandwidth, making the reflector wavelength dependent. In practical cases, most standard grade, low cost, radio frequency ("RF") driven $CO_2$ lasers have their wavelength and polarization states randomly change. Accordingly, polarization and wavelength sensitive feedback control systems may generate inaccuracies, resulting in undesirable power fluctuations. Further, and as a result, it is often recommended to warm up these lasers prior to using them, such as for up to 30 minutes each time the laser is turned on, which makes them unsuitable for applications requiring low lasing time.

Another limitation of known feedback control systems is the presence of a second parasitic reflection happening on the second surface of the beam sampler. The two reflections can interfere at the detector causing an additional instability factor. To remedy this issue, it is often proposed to introduce an angle between the two reflective surfaces, which changes the direction of both reflected and transmitted beams.

Accordingly, improved laser feedback control systems are desired. In particular, laser feedback control systems which provide improved power stabilization control and are polarization insensitive would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a laser feedback control system is provided. The control system includes a laser operable to emit a laser beam. The control system further includes a prism mirror which includes a first reflective surface. The first reflective surface is oriented to reflect the laser beam at a first angle to a first direction of travel of the laser beam. The control system further includes a sampling mirror, the sampling mirror partially reflective and oriented such that the laser beam reflected at the first angle by the first reflective surface encounters the sampling mirror at a polarization insensitive angle of incidence. The control system further includes a detector positioned to detect a portion of the laser beam transmitted through the sampling mirror.

In accordance with another embodiment of the present disclosure, a laser feedback control system is provided. The control system includes a laser operable to emit a laser beam. The control system further includes a prism mirror which includes a first reflective surface and an opposing second reflective surface. The first reflective surface is oriented to reflect the laser beam at a first angle to a first direction of travel of the laser beam. The control system further includes a sampling mirror, the sampling mirror partially reflective and oriented such that the laser beam reflected at the first angle by the first reflective surface encounters the sampling mirror at a polarization insensitive angle of incidence. The control system further includes a detector positioned to detect a portion of the laser beam transmitted through the sampling mirror. The second reflective surface is oriented to reflect a portion of the laser beam reflected by the sampling mirror to the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
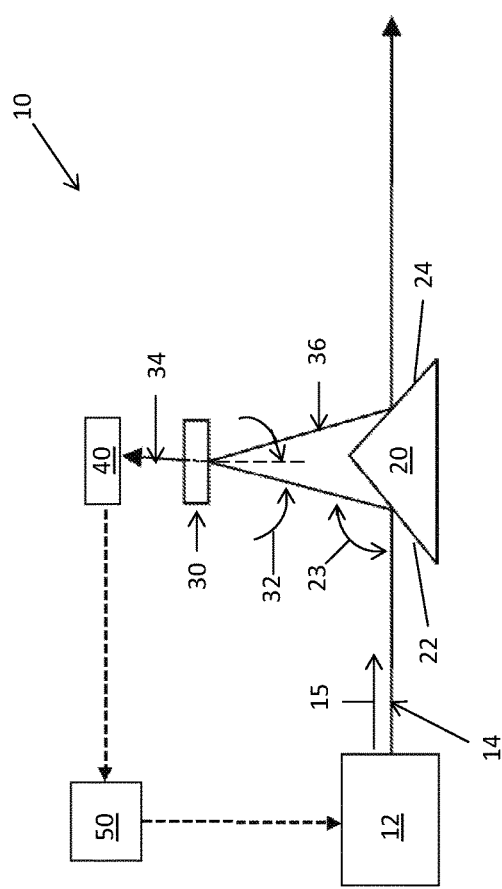
FIG. 1 provides a schematic diagram illustrating components of a laser feedback control system in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
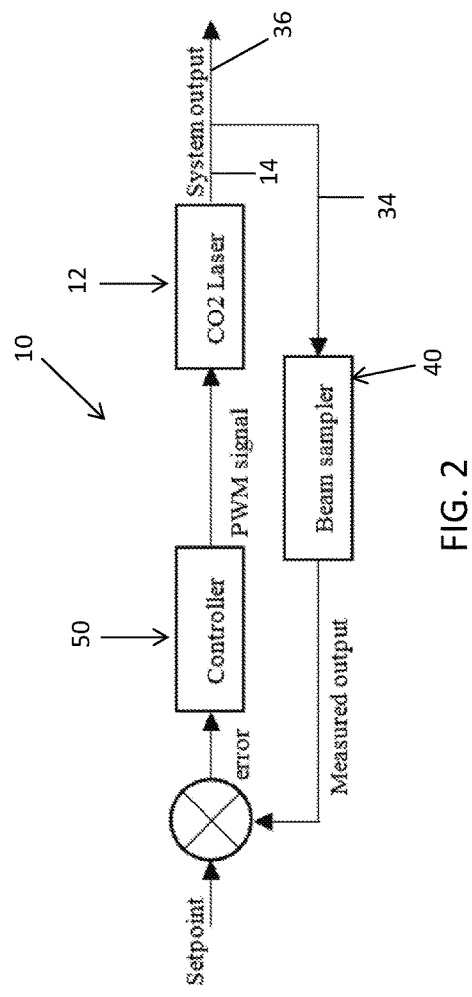
FIG. 2 provides a block diagram illustrating operation of a laser feedback control system in accordance with embodiments of the present disclosure.
Figure 3:
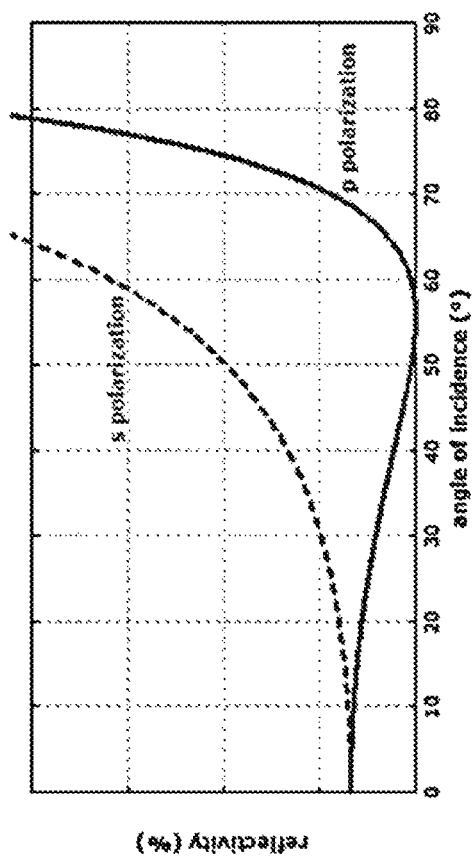
FIG. 3 provides a graph of reflectively versus angle of incidence for s- and p-polarizations in accordance with embodiments of the present disclosure.

Referring now to FIGS. 1-3, the present disclosure is directed to improved laser feedback control systems 10. Control systems 10 in accordance with the present disclosure generally provide improved power stabilization control, in particular by being polarization and wavelength insensitive. Additionally, control systems 10 in accordance with the present disclosure eliminate any significant "ghost beam" and resulting interference issues. Further, control systems 10 in accordance with the present disclosure can advantageously provide the output beam after sampling in the same direction as the input beam from the laser. Advantageously, test results utilizing laser feedback control systems 10 in accordance with the present disclosure have resulted in less than 1% power level fluctuations.

Laser feedback control system 10 may, for example, include a laser 12. In exemplary embodiments, the laser 12 may be a $CO_2$ laser, although alternatively other suitable lasers may be utilized. Laser 12 may be operable to emit a laser beam 14. The laser beam 14 may, after being emitted from the laser 12, encounter a prism mirror 20. As shown, the laser beam 14 may travel in a first direction 15 before encountering and contacting a surface of the prism mirror 20. The first direction 15 may be the direction in which the laser beam 14 was emitted from the laser 12, or another suitable direction after encountering various intervening components such as mirrors, etc.

The prism mirror 20 may include a first reflective surface 22, and may further include an opposing second reflective surface 24. In exemplary embodiments, the first reflective surface 22 and the second reflective surface 24 are formed from the same material. The prism mirror 20 as a whole may, for example, be formed from such material. In exemplary embodiments, the material forming the first reflective surface may be a 100% reflective material, such that the first reflective surface 22 is 100% reflective. Further, in exemplary embodiments, the material forming the second reflective surface may be a 100% reflective material, such that the second reflective surface 24 is 100% reflective. For example, the first reflective surface 22 and/or second reflective surface 24 (and/or prism mirror 20 generally) may be formed from a suitable metal such as copper, or alternatively a silicone or other suitable material.

In exemplary embodiments as discussed herein, the opposing second reflective surface 24 is oriented at a mirror-image angle to the first reflective surface 22 (relative to a central axis between the surfaces 22, 24). Such mirror-image orientation in exemplary embodiments facilitates reflection of the laser beam from the opposing second reflective surface 24 back to the first direction, as discussed herein.

The first reflective surface 22 may be oriented to reflect the laser beam 14 from the first direction 15 at a first angle 23 to the first direction 15. Accordingly, after encountering the first reflective surface 22, the laser beam 14 may travel from the first reflective surface 22 in the direction at the first angle 23 to the first direction 15.

Control system 10 may further include a sampling mirror 30. After being reflected by the first reflective surface 22, the laser beam 14 may encounter the sampling mirror 30, such as surface thereof. The sampling mirror 30 may be formed from a partially reflective material, and thus be partially reflective such that a portion of the laser beam 14 travelling from the first reflective surface 22 is transmitted through the sampling mirror 30 and a portion of the laser beam 14 travelling from the first reflective surface 22 is reflected by the sampling mirror 30. For example, in exemplary embodiments, the sampling mirror 30 may be formed from zinc selenide. Alternatively, other suitable materials from which the sampling mirror 30 may be formed include zinc sulfide, germanium, and gallium arsenide.

In exemplary embodiments, the sampling mirror 30 is less than or equal to 1% transmissive, such as less than or equal to 0.7% transmissive, such as less than or equal to 0.5% transmissive, at a particular laser beam wavelength being utilized and monitored. In exemplary embodiments, the particular laser beam wavelength is between 10 and 11 micrometers, such as between 10.3 and 10.8 micrometers, such as 10.6 micrometers. A sampling mirror 30 having a particular transmissivity allows the specified percentage of laser beam to be transmitted therethrough, and reflects the remainder of the laser beam, as is generally understood.

The sampling mirror 30 may be oriented such that the laser beam reflected at the first angle 23 encounters the sampling mirror 30 at a polarization insensitive angle of incidence 32. A polarization insensitive angle of incidence is an angle of incidence at which the reflectivity percentage is the same for both s- and p-polarizations, as illustrated in FIG. 3. It should be noted that polarization insensitive angles of incidence are material and wavelength dependent, but achievable using any materials and wavelengths. In exemplary embodiments, the polarization insensitive angle of incidence 32 in accordance with the present disclosure may be less than or equal to 6 degrees, such as less than or equal to 5 degrees.

A portion 34 of the laser beam 14 may, upon encountering and thus contacting a surface of the sampling mirror 30, be transmitted through the sampling mirror 30. This portion 34 may, upon being emitted from the sampling mirror 30, be transmitted from the sampling mirror 30 to a detector (also known as a beam sampler) 40. The detector 40, i.e. an infrared detector 40, may be positioned to detect this portion 34 that is transmitted through the sampling mirror 30.

Advantageously, the portion 34 of the laser beam 14 can be utilized to monitor the power lever of the laser 12 and facilitate adjustments as required to maintain a net output power level with minimal fluctuations. For example, in some embodiments, the control system 10 may further include a controller 50. The controller 50 may be in communication with the detector 40 and the laser 12, and may be configured to adjust operation of the laser 12 based on the input signals from the detector 40. The input signals may be based on the portion 34 of the laser beam 14 received by the detector 40. In exemplary embodiments, the controller 50 may for example adjust a pulse width modulation signal based on the detected portion 34 and transmit the adjusted pulse width modulation signal to the laser 12.

The controller 50 may include a memory and microprocessor, such as a general or special purpose microprocessor operable to execute programming instructions or micro-control code associated with processing of signals from the detector 40. The memory may represent random access memory such as DRAM, or read only memory such as ROM or FLASH. In one embodiment, the processor executes programming instructions stored in memory. The memory may be a separate component from the processor or may be included onboard within the processor.

As illustrated, operation of the control system 10 is generally as a closed-loop feedback system. Accordingly, after adjustment of the laser 12, adjusted laser beams 14 are emitted, and portions 34 thereof are detected by detector 40 for further monitoring and adjustment in a closed-loop manner.

As discussed, in exemplary embodiments the prism mirror 20 includes an opposing second reflective surface 24. A portion 30 of the laser beam 14 that encounters the sampling mirror 30 may be reflected by the sampling mirror 30, as discussed above. In exemplary embodiments, the second reflective surface 24 may be positioned such that the portion 36 after being reflected by the sampling mirror 30 encounters the second reflective surface 24. The second reflective surface 24 may thus be oriented to reflect that portion 36 of the laser beam 14 reflected by the sampling mirror 30. In exemplary embodiments, the portion 36 is reflected by the second reflective surface 24 to the first direction 15. Accordingly, in these embodiments, a substantial portion of the laser beam 14 can continue along the first direction 15 following transmission through the control system 10.

Notably, the various surface discussed herein, such as the first reflective surface 22, second reflective surface 24, and the surface of the sampling mirror 30 which laser beam 14 encounters, are generally polished, planer surfaces. Accordingly, suitable reflection and transmission as discussed herein are facilitated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, of if they include equivalent structural elements with insubstantial differences from the literal languages of the claims.

What is claimed is:

1. A laser feedback control system, comprising:
   a laser operable to emit a laser beam;
   a prism mirror comprising a first reflective external surface, the first reflective external surface oriented to reflect the laser beam at a first angle to a first direction of travel of the laser beam;
   a sampling mirror, the sampling mirror partially reflective and oriented such that the laser beam reflected at the first angle by the first reflective external surface encounters the sampling mirror at a polarization insensitive angle of incidence; and
   a detector positioned to detect a portion of the laser beam transmitted through the sampling mirror.

2. The control system of claim 1, further comprising a controller configured to adjust a pulse width modulation signal based on the detected portion of the laser beam and transmit the adjusted pulse width modulation signal to the laser.

3. The control system of claim 1; wherein the laser is a $CO_2$ laser.

4. The control system of claim 1, wherein the polarization insensitive angle of incidence is less than or equal to 6 degrees.

5. The control system of claim 1, wherein the first reflective external surface is a polished; planar surface.

6. The control system of claim 1, wherein the sampling mirror is less than or equal to 1% transmissive at a 10.6 micrometer wavelength.

7. The control system of claim 1, wherein the sampling mirror is formed from zinc selenide.

8. The control system of claim 1, wherein the prism mirror further comprising an opposing second reflective surface.

9. The control system of claim 8, wherein the second reflective surface is a polished, planar surface.

10. The control system of claim 8, wherein the second reflective surface is oriented to reflect a portion of the laser beam reflected by the sampling mirror.

11. The control system of claim 10, wherein the portion of the laser beam reflected by the second reflective surface is reflected to the first direction.

12. A laser feedback control system, comprising:
    a laser operable to emit a laser beam;
    a prism mirror comprising a first reflective external surface and an opposing second reflective external surface, the first reflective external surface oriented to reflect the laser beam at a first angle to a first direction of travel of the laser beam;
    a sampling mirror, the sampling mirror partially reflective and oriented such that the laser beam reflected at the first angle by the first reflective external surface encounters the sampling mirror at a polarization insensitive angle of incidence; and
    a detector positioned to detect a portion of the laser beam transmitted through the sampling mirror,
    wherein the second reflective external surface is oriented to reflect a portion of the laser beam reflected by the sampling mirror to the first direction.

13. The control system of claim 12, further comprising a controller configured to adjust a pulse width modulation signal based on the detected portion of the laser beam and transmit the adjusted pulse width modulation signal to the laser.

14. The control system of claim 12, wherein the laser is a $CO_2$ laser.

15. The control system of claim 12, wherein the polarization insensitive angle of incidence is less than or equal to 6 degrees.

16. The control system claim 12, wherein the first reflective external surface is a polished, planar surface.

17. The control system of claim 12, wherein the sampling mirror is less than or equal to 1% transmissive at a 10.6 micrometer wavelength.

18. The control system of claim 12, wherein the sampling mirror is formed from zinc selenide.

19. The control system of claim 12, wherein thy: second reflective external surface is a polished, planar surface.

* * * * *

UNITED STATES PATENT AND TRADEMARK OFFICE
CERTIFICATE OF CORRECTION

PATENT NO. : 10,374,384 B2
APPLICATION NO. : 15/746274
DATED : August 6, 2019
INVENTOR(S) : Mohamed Amine Jebali and Ryo Hasegawa It is certified that error appears in the above-identified patent and that said Letters Patent is hereby corrected as shown below:

On the Title Page

Under (72) Inventors: "Ryo Hasehawa" should read "Ryo Hasegawa"

Signed and Sealed this
Seventh Day of July, 2020

Andrei Iancu
*Director of the United States Patent and Trademark Office*